United States Patent [19]

Bartholomaus

[11] Patent Number: 4,491,153

[45] Date of Patent: Jan. 1, 1985

[54] PRESSURE REDUCING VALVE

[75] Inventor: Reiner Bartholomaus, Neuendorf, Fed. Rep. of Germany

[73] Assignee: Mannesmann Rexroth GmbH, Fed. Rep. of Germany

[21] Appl. No.: 384,391

[22] Filed: Jun. 2, 1982

[30] Foreign Application Priority Data

Jun. 26, 1981 [DE] Fed. Rep. of Germany ....... 3125143

[51] Int. Cl.³ ........................................... F15B 13/044
[52] U.S. Cl. ............................. 137/625.65; 137/116.3; 137/625.68; 91/433
[58] Field of Search ........... 137/116.3, 625.65, 625.68; 251/282; 91/433

[56] References Cited

U.S. PATENT DOCUMENTS

| 2,403,519 | 7/1946 | Gardiner | 251/48 X |
| 3,766,944 | 10/1973 | Distler | 137/625.6 |
| 3,995,652 | 12/1976 | Belart et al. | 137/116.3 X |
| 4,071,042 | 1/1978 | Lombard et al. | 137/116.3 X |
| 4,184,512 | 1/1980 | Pignolet | 137/625.68 X |
| 4,316,599 | 2/1982 | Bouvet et al. | 137/625.65 X |
| 4,341,243 | 7/1982 | Melocik | 137/625.68 |

Primary Examiner—Gerald A. Michalsky
Assistant Examiner—John C. Fox
Attorney, Agent, or Firm—Roylance, Abrams, Berdo & Goodman

[57] ABSTRACT

A pressure reducing valve comprises a valve housing having an axial bore coupled to a fluid operated load device, and first and second transversely extending control bores coupled to a supply tank and a fluid pressure source, respectively. A control slide is axially shiftable in the axial bore and has first and second pistons controlling fluid flow through the control bores. The fluid pressure supplied to the load device acts on a first end of the control slide. A proportional electromagnet has a plunger which contacts and applies force to the opposite end of the control slide. A first restrictor provides fluid communication between the control slide ends, while a second restrictor provides fluid communication between the control slide opposite end and the supply tank.

14 Claims, 2 Drawing Figures

4,491,153

PRESSURE REDUCING VALVE

The present invention relates to a pressure reducing valve having an axially movable control slide actuated by the plunger of a proportional electromagnet.

BACKGROUND OF THE INVENTION

In conventional pressure reducing valves having control slides actuated by plungers of proportional electromagnets, the force exerted by the plunger of the proportional electromagnet on the control slide opposes the force exerted by the control pressure on the control slide. In order to overcome the force exerted by the control pressure, the proportional electromagnet used must be capable of exerting a greater counterforce. Additionally, the control slide must have its slider piston precisely underlap the control bore controlling the connection to the supply tank, since the flow of the control fluid is determined by such underlap.

In a conventional pressure reducing valve with pilot control, a restrictor is provided in the bore extending longitudinally within the control slide and a pilot valve is connected at the outlet side of this restrictor. The side of the pilot valve facing away from the control slide is connected with the supply tank or a remote control connection. The pilot valve causes a pressure build up which acts in the same direction on the control slide as the force of the spring biasing the control slide. This pressure build up by the pilot valve would not assist a force applied to the control slide which opposes the spring action on the control slide. (see e.g., Dieter, "Oelhydraulik Fibel", KraussKopf Verlag, Wiesbaden, 1960, p. 183).

BRIEF DESCRIPTION OF THE INVENTION

An object of the present invention is to provide a pressure reducing valve with a proportional electromagnet which produces a smaller electromagnetic force than that presently required in conventional pressure reducing valves.

Other objects, advantages and salient features of the present invention will become apparent from the following detailed description of the preferred embodiments of the invention.

Briefly described, the present invention includes a pressure reducing valve comprising a valve housing having an axial bore coupled to a fluid operated load device, and first and second transversely extending control bores coupled to a supply tank and a fluid pressure source, respectively. A control slide is axially shiftable in the axial bore and has first and second pistons controlling fluid flow through the control bores. The fluid pressure supplied to the load device acts on a first end of the control slide. A proportional electromagnet has a plunger which contacts and applies force to the opposite end of the control slide. A first restrictor provides fluid communication between the control slide ends, while a second restrictor provides fluid communication between the control slide opposite end and the supply tank.

In this manner, the pressure reducing valve of the present invention creates a hydraulic force which acts on the control slide in the same direction as the force exerted by the proportional electromagnet. This hydraulic force results from an intermediate pressure developed between the two restrictors, which intermediate pressure is higher than the pressure in the supply tank, is lower than the control pressure and acts counter to the control pressure on the control slide. Since the force applied to the control slide by the intermediate pressure acts in the same direction as the force exerted by the plunger of the electromagnet, the plunger force necessary is reinforced, permitting use of a lower magnetic force in the pressure reducing valve according to the present invention than in corresponding conventional pressure reducing valves.

The volume flow of the pressure agent flowing back to the supply tank depends on the control pressure and the cross section of the restrictor orifices. The control slide employs the overlap of its slider piston with the first control bore to control the connection to the supply tank, without reciprocal movement of the control slide for switching as in a conventional pressure reducing valve in which the control slide regulates flow by overlapping the control bores. The conventional slide must continuously be moved back and forth by an amount which is greater than the overlap to regulate a certain pressure. In the pressure reducing valve of the present invention, the restrictors act similar to the overlap of the control slide and control bores. Thus, the overlap of the slider piston and the control bore coupled to the supply tank need not be particularly precise.

The control slide can have an internal bore extending from its first end to a point beyond both pistons, being in fluid communication with the space between the pistons and housing the first restrictor. The internal diameters can have a ratio dependent on a particular relationship of the magnetic force of the proportional electromagnet, pressure supplied to the load device and the control slide effective area acted on by the pressure supplied to the load device. The first piston can house the second restrictor and have an annular groove in fluid communication with the second restrictor.

A valve chamber in the housing can house the plunger and the control slide end acted thereon and can be in fluid communication with the first restrictor through a third restrictor. In this manner, no pressure agent flows through the valve chamber containing the plunger of the proportional electromagnet, preventing contamination of the chamber.

BRIEF DESCRIPTION OF THE DRAWINGS

In order that the manner in which the foregoing and other objects are attained in accordance with the invention can be understood in detail, particular advantageous embodiments thereof will be described with reference to the accompanying drawings, which form a part of this specification, and wherein.

DETAILED DESCRIPTION OF THE PREFERRED EMBODIMENTS OF THE INVENTION

Figure 1:
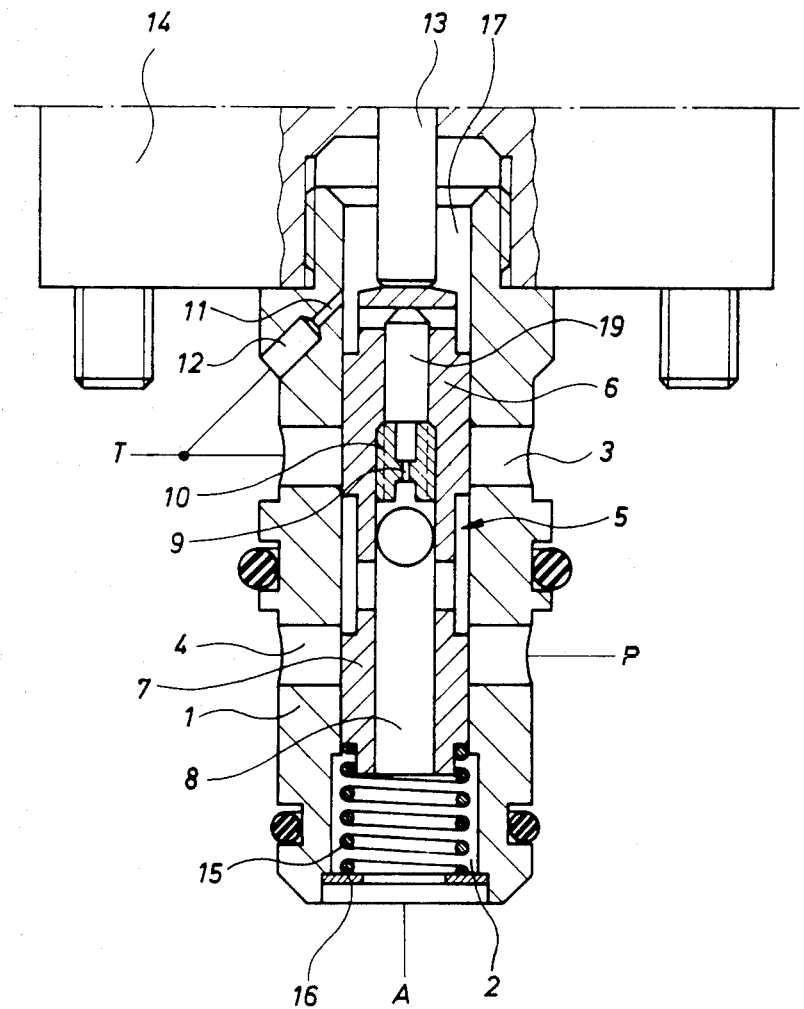
FIG. 1 is a side elevational view, partially in section, of a pressure reducing valve in accordance with one embodiment of the present invention.

Referring initially to FIG. 1, the pressure reducing valve according to one embodiment of the present invention comprises hollow cylindrical valve housing 1, circularly shaped in transverse cross section and having an axial bore 2 and transverse control bores 3 and 4 spaced along the longitudinal axis of the housing. The transverse control bore 4 is connected to a fluid pressure source P and the transverse control bore 3 is coupled to a supply tank T. The lower end of the axial bore 2 is connected to a fluid operated load device A.

A control slide 5 has slide pistons 6 and 7 spaced apart along the longitudinal axis of the control slide and is mounted for axial movement in the axial bore 2. The slide piston 6 controls fluid flow through the transverse control bore 3 and the slide piston 7 fluid flow through the transverse control bore 4. In the regulated position of the control slide 5, shown in the drawing, the transverse control bore 3 is closed by slide piston 6 and the transverse bore 4 is opened as far as corresponds to the discharge of pressure agent through the restrictor into the supply tank T.

The control slide 5 has a longitudinal or axial bore 8 which connects its two end faces. Bore 8 is connected through a transverse bore to the space lying between the two slide pistons 6,7. Adjacent slide piston 6, a first restrictor 9 is provided in a throttling body 10, which throttling body can be threaded into the control slide. A second restrictor 11 is provided in a connecting bore 12, formed in the valve housing 1, which connecting bore connects the upper end face of the control slide 5, as illustrated in FIG. 1, with the supply tank T.

A plunger 13 of a proportional electromagnet 14 acts on the upper end face of the control slide 5. The opposite control or end face of the control slide 5 is directed toward load device A and is acted on by the control pressure prevailing in the load device. A spring 15 is clamped between the control slide and an apertured disc 16 and biases control slide 5 upwardly to compensate for the weight of the control slide 5 and of the plunger together with the armature of the proportional electromagnet 14 attached thereto. Whenever the proportional electromagnet 14, contrary to the illustrated embodiment, is disposed below control slide 5, then the spring 15 may be omitted because the weight of the control slide acts as a power storage.

The valve housing 1 is adapted for insertion into another housing and the proportional electromagnet 14 is adapted for attachment to the other housing. The valve housing 1, on its outer surface, has annular grooves which receive sealing rings.

The load device is connected through the first restrictor 9 with the end of the control slide 5 remote from the spring 15 and in a valve chamber 17. Valve chamber 17 is connected through the second restrictor 11 with the supply tank so that a pressure develops in the valve chamber 17 during operation between the pressures in the load device A and in the supply tank T. This intermediate pressure acts counter to the spring 15 and the control pressure prevailing in the load device, i.e., in the direction of force applied by the plunger on the control slide 5. In the normal position of the control slide 5 shown in FIG. 1, the pump P is connected with load device A such that the flow of pressure agent through restrictor 9 to the supply tank T, is balanced out.

When the control slide 5 is shifted by plunger 13 in the direction of the spring 15, a connection is established between the fluid pressure source P and load device A through transverse control bore 4, the part of the longitudinal bore 8 of the control slide 5 adjacent to the spring 15, and the part of the axial bore 2 containing the spring 15. When control slide 5 is shifted in the opposite direction toward electromagnet 14, load device A is connected with the supply tank T through bore 3, the part of the longitudinal bore 8 adjacent the spring 15, and the part of the axial bore 2 containing the spring 15. The pressure in the valve chamber 17 depends on the pressure prevailing on load device A.

A preferred pressure in the valve chamber 17 will be achieved by balancing of the two restrictors according to the relationship $$d_2/d_1 = [1/[1 - F/(p \cdot A)] - 1]^{0.25},$$

wherein a deviation of plus or minus 15 percent, especially 10 percent is considered as being within permissible limits and wherein:

$d_2$ = the internal diameter of the second restrictor 11
$d_1$ = the internal diameter of the first restrictor 9
F = the magnetic force of the proportional electromagnet
P = the pressure on the load device
A = the effective surface area of the end of control slide 5 connected to the load device.

This relationship is simplified since the spring constants of the proportional electromagnet 14 and of the spring 15 are not contained therein. The fluctuation range of plus or minus 15 percent results from the variable flow-through characteristics of the restrictors 9 and 11, and well as from the production tolerances of the embodiment cited as an example. The fluctuation range is relatively small whenever both restrictors 9 and 11 are equal and are wedge-shaped (cup-point shaped) in axial cross section.

The restrictor 11 can be formed in a spiral-shape, as a longitudinally running outside groove, as a bore, or as a clearance between slide piston 6 and the bore in valve housing 1 containing slide piston 6.

Figure 2:
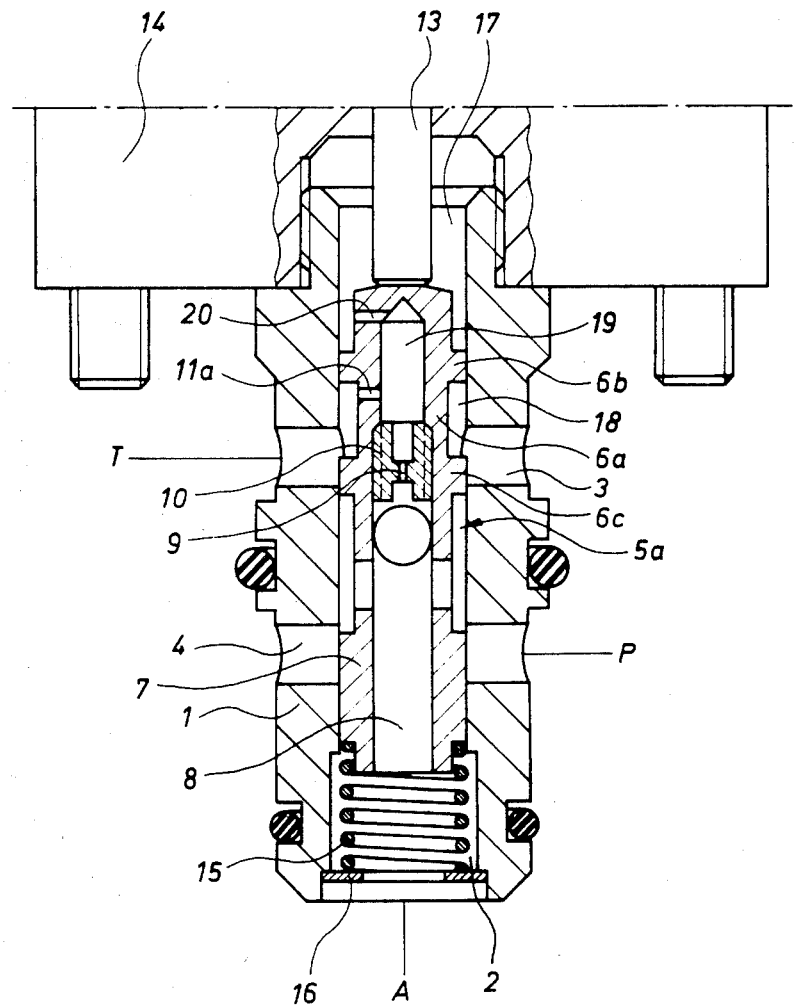
FIG. 2 is a side elevational view, partially in section, of a pressure reducing valve in accordance with a second embodiment of the present invention.

In FIGS. 1 and 2, the same parts have the same reference symbols. Variations of parts are characterized by the addition of lower case letters.

Referring to the second embodiment illustrated in FIG. 2, the slide piston 6a has an annular groove 18 which separates its piston parts 6b from 6c. The piston part 6c controls the connection of load device A to the supply tank T through transverse control bore 3, while the piston part 6b separates the supply tank T from the valve chamber 17. The annular groove 18 is connected through a restrictor 11a to the longitudinal bore 8 of the control slide 5a on the side of the restrictor 9 remote from the connection of load device A. The part of the longitudinal bore 8 above the restrictor 9 is labeled 19. The bore part 19 is connected to valve chamber 17 through a restrictor 20. Thus, the pressure agent flowing through the pressure reducing valve does not flow through chamber 17, thereby preventing contamination of chamber 17. In the second embodiment, all restrictors 9, 11a and 20 are advantageously located in the control slide 5a.

The normal position of the control slide 5 changes depending on the pressure of the pump P and on the adjusted pressure of the load device A. The control slide 5 is located, for example, outside its normal position, whenever the pressure in the load device A is reduced by a change in the voltage supplied to the proportional electromagnet 14. The control pressure is decreased as a result of a corresponding volume flow of pressure agent flowing to the supply tank T when control slide 5 blocks transverse control bore 4 connected with the pump P and opens transverse control bore 3 connected with supply tank T. When the control pressure in the load device is to be raised, transverse control bore 3 connected with supply tank T is blocked by control slide 5 and transverse control bore 4 connected with the pump P is opened so that pressure agent may flow from pump P to load device A, thereby raising the control pressure. After each regulating process, control slide 5 returns into its normal position shown in the drawings, in which the inflow from the pump P is equal to the discharge into supply tank T.

The pressure developed in valve chamber 17 applies a force to control slide 5 acting in the same direction as the force applied by plunger 13 of proportional electromagnet 14 and acting opposite to the force applied by the control pressure on load device A. Thus, a smaller magnetic force is necessary to move plunger 13 and control slide 5 in the pressure reducing valve of the present invention, than is necessary in conventional pressure reducing valves.

While certain advantageous embodiments have been chosen to illustrate the invention, it will be understood by those skilled in the art that various changes and modifications can be made therein without departing from the scope of the invention as defined in the appended claims.

What is claimed is:

1. A pressure reducing valve, comprising:
   a valve housing having an axial bore and first and second transversely extending control bores, said axial bore forming a valve chamber at one end thereof;
   first means for coupling said first control bore to a supply tank;
   second means for coupling said second control bore to a fluid pressure source;
   a control slide axially shiftable in said axial bore of said housing, having first and second pistons controlling fluid flow through said first and second control bores, respectively, and having first and second opposite ends, said second end being located in said valve chamber;
   third means for coupling said axial bore to a fluid operated load device with the fluid pressure supplied thereto acting directly on said control slide first end, and for conveying fluid pressure from the load device to said valve chamber;
   a proportional electromagnet having a plunger extending through said valve chamber and contacting and applying forces to said control slide second end; and
   first and second restrictors, said first restrictor providing fluid communication between said control slide ends, said second restrictor providing fluid communication between said valve chamber, said control slide second end and said first means.

2. A pressure reducing valve according to claim 1 wherein said control slide has an internal bore extending from said first end to a point beyond said first and second pistons, being in fluid communication with a space between said pistons, and housing said first restrictor therein.

3. A pressure reducing valve according to claim 2 wherein said first and second restrictors have first and second internal diameters having a ratio, plus or minus 15 percent, defined by:

$$d_2/d_1 = [1/[1 - F/(p \cdot A)] - 1]^{0.25}$$

in which:
$d_1$ = said first internal diameter,
$d_2$ = said second internal diameter,
F = magnetic force of said proportional electromagnet,
P = pressure at said third means, and
A = effective surface area of said control slide first end.

4. A pressure reducing valve according to claim 3 wherein a third restrictor provides fluid communication between said chamber and said first restrictor.

5. A pressure reducing valve according to claim 2 wherein said second restrictor is located in said first piston and said first piston has an annular groove in fluid communication with said second restrictor.

6. A pressure reducing valve according to claim 2 wherein a third restrictor provides fluid communication between said valve chamber and said first restrictor.

7. A pressure reducing valve according to claim 1 wherein said first and second restrictors have first and second internal diameters having a ratio, plus or minus 15 percent, defined by:

$$d_2/d_1 = [1/[1 - F/(p \cdot A)] - 1]^{0.25}$$

in which:
$d_1$ = said first internal diameter,
$d_2$ = said second internal diameter,
F = magnetic force of said proportional electromagnet,
P = pressure at said third means, and
A = effective surface area of said control slide first end.

8. A pressure reducing valve according to claim 7 wherein said second restrictor is located in said first piston and said first piston has an annular groove in fluid communication with said second restrictor.

9. A pressure reducing valve according to claim 7 wherein a third restrictor provides fluid communication between said chamber and said first restrictor.

10. A pressure reducing valve according to claim 1 wherein said second restrictor is located in said first piston and said first piston has an annular groove in fluid communication with said second restrictor.

11. A pressure reducing valve according to claim 1 wherein said housing comprises a valve chamber housing said plunger and said control slide second end, and wherein a third restrictor provides fluid communication between said chamber and said first restrictor.

12. A pressure reducing valve, comprising:
   a valve housing having an axial bore and first and second transversely extending control bores;
   first means for coupling said first control bore to a supply tank;
   second means for coupling said second control bore to a fluid pressure source;
   a control slide axially shiftable in said axial bore of said housing, having first and second pistons controlling fluid flow through said first and second control bores, respectively, and having first and second opposite ends, said control slide including an internal bore extending from said first end to a point beyond said first and second pistons, said bore being in fluid communication with a space between said pistons;
   third means for coupling said axial bore to a fluid operated load device with the fluid pressure supplied thereto acting on said control slide first end;
   a proportional electromagnet having a plunger contacting and applying forces to said control slide second end; and first and second restrictors, said first restrictor being housed in said bore and providing fluid communication between said control slide ends, said second restrictor providing fluid communication between said control slide second end and said first means.

13. A pressure reducing valve according to claim 12 wherein said housing comprises a valve chamber housing said plunger and said control slide second end, and wherein a third restrictor provides fluid communication between said chamber and said first restrictor.

14. A pressure reducing valve, comprising:
a valve housing having an axial bore and first and second transversely extending control bores;
first means for coupling said first control bore to a supply tank;
second means for coupling said second control bore to a fluid pressure source;
a control slide axially shiftable in said axial bore of said housing, having first and second pistons controlling fluid flow through said first and second control bores, respectively, and having first and second opposite ends, said first piston having an annular groove;
third means for coupling said axial bore to a fluid operated load device with the fluid pressure supplied thereto acting on said control slide first end;
a proportional electromagnet having a plunger contacting and applying forces to said control slide second end; and
first and second restrictors, said first restrictor providing fluid communication between said control slide ends, said second restrictor providing fluid communication between said control slide second end and said first means, said second restrictor being located in said first piston and being in fluid communication with said annular groove.

* * * * *